United States Patent [19]
Maeda

[11] Patent Number: 5,952,812
[45] Date of Patent: Sep. 14, 1999

[54] AC-DC POWER CONVERTING DEVICE

[75] Inventor: Noboru Maeda, Chiryu, Japan

[73] Assignee: Nippon Soken, Inc., Nishio, Japan

[21] Appl. No.: 08/975,319

[22] Filed: Nov. 21, 1997

[30] Foreign Application Priority Data

Nov. 26, 1996 [JP] Japan .................................... 8-331486

[51] Int. Cl.[6] .................................................... H02P 5/34
[52] U.S. Cl. ............................................. 318/803; 363/44
[58] Field of Search .................................... 318/800, 801, 318/803, 807; 323/272, 282, 266; 363/44, 46, 84, 89, 125, 126; 307/116, 151

[56] References Cited

U.S. PATENT DOCUMENTS 4,222,096  9/1980  Capewell ................................ 363/126

FOREIGN PATENT DOCUMENTS

| 59-176339 | 11/1984 | Japan . |
| 3-203527  | 9/1991  | Japan . |
| 4-101602  | 4/1992  | Japan . |
| 7-087616  | 3/1995  | Japan . |
| 2103396   | 2/1983  | United Kingdom ..................... 363/86 |

Primary Examiner—William M. Shoop, Jr.
Assistant Examiner—Rina Duda
Attorney, Agent, or Firm—Pillsbury Madison & Sutro LLP

[57] ABSTRACT

A circuit comprises a two-way switch and an inductor and is disposed between an ac power source and a rectifier so that the circuit provides a voltage higher than the source voltage. The unit provides a high voltage dc power to charge a battery of an electric vehicle. If the inductor is accurately grounded, the circuit stops the flow of dc current thus preventing electric corrosion in the vehicle body.

14 Claims, 7 Drawing Sheets

AC-DC POWER CONVERTING DEVICE

CROSS REFERENCE TO RELATED APPLICATION

The present application is based on and claims priority from Japanese Patent Application No. Hei 8-331486, filed on Nov. 26, 1996, the contents of which are incorporated herein by reference.

BACKGROUND OF THE INVENTION

1. Field of the Invention

The present invention relates to an ac-dc converting device for converting power supplied by an outside ac power source to charge a battery of an electric vehicle.

2. Description of the Related Art

Such an ac-dc power converting device for an electric vehicle has a rectifier for rectifying alternating current to direct current. Because the output voltage of the rectifier varies with the height of the voltage wave, a transformer is used to provide a high voltage. Since such a transformer is bulky and heavy, JP-A-7-87616 proposes a system which is composed of a circuit for rectifying the commercial ac power source to dc power and series-connected circuit of a switch and an inductor. The output power of the circuit is accumulated in the inductor while the switch is turned on, and the output voltage is raised when the switch is turned off. The system, which is proposed for an electric vehicle, uses stator windings of an ac drive motor of a vehicle in order to reduce the weight and cost of the system.

However, if the insulator of one of the stator windings of the system deteriorates, and the one of the stator windings is short-circuited to the vehicle body by accident, a dc current flows from the one of the stator windings through the vehicle body—which is grounded while the battery is being charged for safety reason. Such a dc current also flows through the grounded portion of the vehicle body, the grounded terminal of the electric source, the other terminal of the electric source, the rectifier and the one of the stator windings. This may cause the electric corrosion of the vehicle body.

SUMMARY OF THE INVENTION

In order to address this problem a main object of the present invention is to provide an ac-dc power converting device which prevents the electric corrosion of the vehicle body.

According to a preferred embodiment of the present invention, an ac-dc power converting device comprises terminal means connected to the ac electric source, a rectifier connected to the electric load, an inductor connected in parallel with the rectifier and a first switch for controlling ac current supplied to the inductor at a cycle shorter than a cycle of the ac power.

Therefore, dc current can not be supplied to the inductor from the electric load, and no dc current flows through the vehicle body even if the inductor is grounded by accident, thereby preventing the electric corrosion of the vehicle body.

According to another feature of the present invention, the first switch comprises a pair of two way switch units connected between the terminal means and the inductor. The switch units are turned on and off to supply ac current to the inductor at a frequency higher than the alternating frequency of the ac power source and the audible frequency.

According to another feature of the present invention, the ac-dc power converting device further comprises a second switch which is connected between the inductor and input portion of the rectifier. The second switch interrupts current supplied to the rectifier when the first switch turns on. Therefore, even when the first switch turns on, rush current is prevented from flowing into the rectifier from the power source.

According to another feature of the present invention, the first switch has a current detecting unit which detects the input current supplied to the ac-dc power converting device and a control unit which controls the first switch according to a current signal of the current detecting unit. Therefore, a mean value of current supplied to the ac-dc power converting device in a switching cycle can be proportional to an instantaneous value of voltage of the electric source. The switching cycle of the first switch is set much shorter than the alternating cycle of the power source so that the mean value of the current to be supplied to the ac-dc power converting device in a switching cycle can be made proportional to the voltage applied thereto. Thus, the power factor of the power to be supplied to the ac-dc power converting device becomes nearly 1.

According to another feature of the present invention, the first switch is controlled to remain turned off until current of the inductor becomes zero. Therefore, the current supplied to the ac-dc converting device becomes proportional to time, and power is supplied from the electric source efficiently.

According to another feature of the present invention, the ac-dc power converting device can be combined with a motor driving system which is composed of an ac motor having stator windings, an inverter which controls the motor, and a current sensor which ordinarily detects the driving current of the stator windings. In the above system, a portion of the stator windings is used as the above-stated inductor, the flywheel diodes of the inverter are used for the above rectifier, and the current sensor is used for the current detecting unit stated above.

According to another feature of the present invention, the ac-dc power converting device can be combined with a motor driving system which is composed of an ac motor having multiple phase-windings, an inverter for controlling the ac motor and a plurality of current sensors for detecting currents of the phase windings supplied from the inverter. A portion of the phase windings is used for the above-stated inductor, four of six flywheel diodes of the inverter are used for the rectifier, and flywheel diodes of the inverter are used for the above stated rectifier, and some of the current sensors are disposed to detect both currents supplied from the first switch and supplied from the inverter. Therefore, an improved ac-dc power converting device can be provided without addition of various specific parts.

If a permanent magnet type motor is used as the wheel-driving motor in the system according to the second embodiment of the invention which utilizes windings 2U and 2W as the inductor, the driving motor may be vibrated by the alternating magnetic field generated by windings 2U and 2W while they are supplied with ac current from ac electric source 11. If the supplied current is large, vibration noise causes become harsh. Such vibration may wear on some parts or components of the driving system.

Therefore, another object of the present invention is to provide a battery charging system which can suppress the vibration of the ac motor.

According to another feature of the present invention, the ac-dc power converting device comprises a relay connected between the first two-way switch and the stator windings. The relay changes connection of the switch and at least one of the stator windings. In addition, the device comprises rotor condition detecting means for providing a signal related to rotor vibration and a control unit for controlling the relay and the inverter according to the signal related to rotor vibration so that at least one of the stator windings is supplied with control current from the relay through the inverter to suppress vibration of the rotor while the dc power is supplied to the electric load.

The relay can be arranged to cut the connection between the first two-way switch and the stator windings while the ac motor is driven by the inverter. The rotor condition detecting means can be a position sensor or a vibration sensor.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS (First Embodiment)

Figure 1:
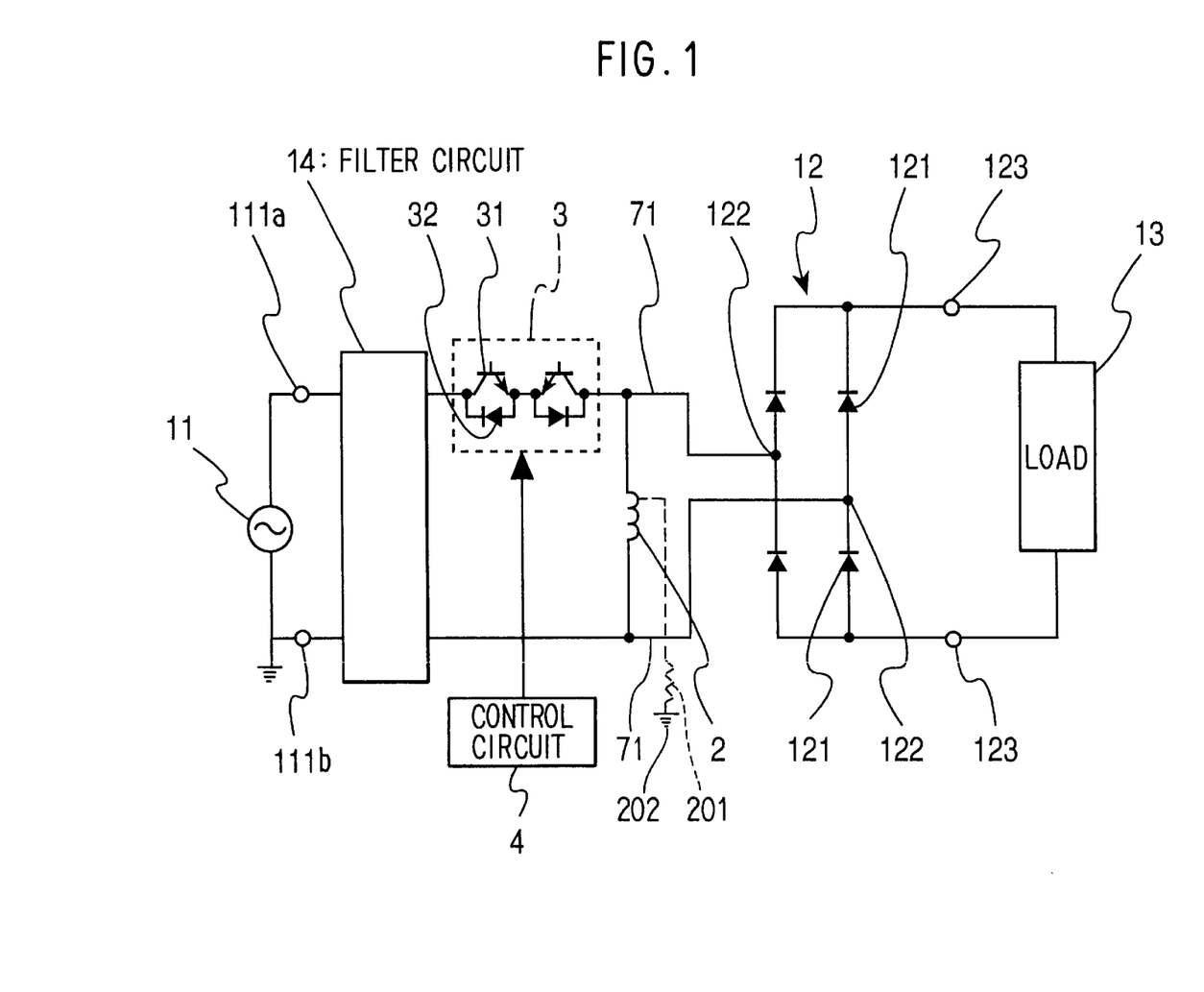
FIG. 1 is a circuit diagram showing an ac-dc power converting device according to a first embodiment of the present invention.

In FIG. 1, an ac-dc power converting device which is mounted on an electric vehicle rectifies ac power supplied from an ac electric source 11 to dc power, which is supplied to an electric load 13 such as a battery. AC electric source 11 is a single phase commercial power source whose alternating frequency is 50 Hz or 60 Hz. AC electric source 11 has a pair of output terminals 111a and 111b, which are connected by lead wires 71 to a pair of input terminals 122 of a rectifier 12 through a filter circuit 14. Rectifier 12 is a single-phase full-wave bridge circuit composed of four diodes 121 and has a pair of output terminals 123 connected to an electric load 13 such as an electronic control device or a battery. An inductor 2 or a coil is connected in parallel with the input terminals of rectifier 12 through wires 71. Thus, dc current can not be supplied to the inductor from electric load 13 in any event.

A switch circuit 3 is connected between filter circuit 14 and rectifier 12. Switch circuit 3 is composed of a pair of parallel circuits of a transistor 31 and a diode 32, which are connected in series to form a two-way switch unit.

The base of each of the transistors 31 is connected to a control circuit 4, which provides pulse voltages to turn on and off transistors 31 at a cycle between a few kHz and several-tens kHz. Because of the two-way switch unit composed of switching transistors 31 and diodes 32, the ac current flowing therethrough in opposite directions can be controlled.

An inductor 2 or a coil is connected in parallel with the filter circuit 14, switch circuit 3 turns on and off at a cycle sufficiently higher than the alternating cycle of the power source. While switch circuit 3 is turned on, indicator 2 accumulates electric power. The electric power discharges from inductor 2 to rectifier 12 when switch circuit 3 is turned off, and the voltage across input terminals 122 of rectifier 12 is raised by the self-induction of inductor 2. Thus, dc power of a suitable voltage is supplied to the electric load from rectifier 12.

Filter circuit 14 comprises a common coil, which smoothes the current deformed due to operation of switch circuit 3. This prevents high-frequency resonant waves from transmitting to electric source 11 and prevent rush current from flowing to rectifier 12 when the switch circuit is turned on.

If the insulator of inductor 2 deteriorates and a portion of inductor 2 is short-circuited to vehicle body 201—which is usually grounded at a portion 202 while the battery is being charged—leak current flows from electric source 11—whose one terminal 111b is usually grounded—through portion 25 of inductor 2. Portion 25 of the inductor 2 is short-circuited to vehicle body 201, grounded portion 202 and back to electric source 11 through grounded terminal 111b. Since inductor 2 is supplied with ac current from two-way switch circuit 3, the leak current also flows in the opposite direction. Thus, the leak current does not include the dc current, and electric corrosion can be prevented.

(Second Embodiment)

Figure 2:
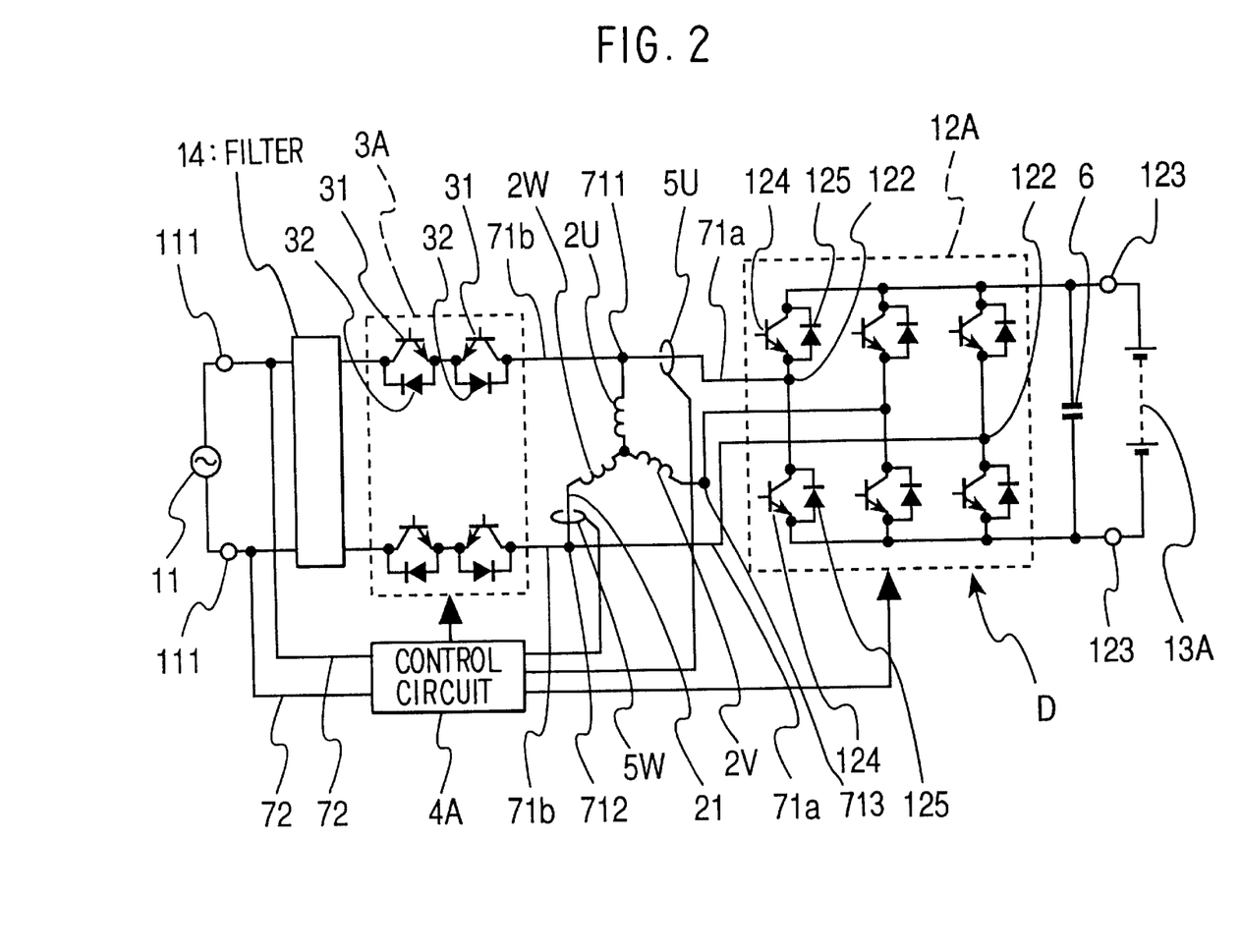
FIG. 2 is a circuit diagram showing an ac-dc power converting device according to a second embodiment of the present invention.

A battery charging system using an ac-dc power converting system according to second embodiment is described with reference to FIG. 2, in which the same reference numeral corresponds to the same or substantially the same part or component as those of the first embodiment. The battery charging system charges a battery 13A of an electric vehicle and includes a portion of a three-phase ac-motor driving circuit D.

Motor driving circuit D has an inverter 12A for supplying current to stator windings 2U, 2V and 2W of the ac motor for driving the vehicle wheels and a capacitor 6 for stabilizing the current supply.

Inverter 12A is a common type inverter in which three series circuits of a pair of switching transistors 124 are connected in parallel with one another to form a three-phase full-wave bridge. Battery 13A is connected in parallel with the three series circuits. Each of switching transistors 124 has a flywheel diode 125 connected in parallel therewith. Inverter 12A has three input terminals 122 extending from junctions of series connected transistors 124, and each of them is connected to one of output terminals 711, 712 and 713 of star-connected stator windings 2U, 2V and 2W. Phase current sensor 5U is disposed on a portions of a wire 71a connecting stator winding 2U to one of input terminals 122, and a phase current sensor 5W is disposed on an extension 21 of stator winding 2W. Another phase current sensor for stator winding 2V is not shown because it is not used for the battery charging operation, however it can be disposed to detect current of stator winding 2V in the same manner. A control circuit 4A provides on-off control signals supplied to the bases of switching transistors 124 according to the phase current detected by the phase current sensors, thereby PWM-controlling the motor driving currents supplied to stator windings 2U, 2V and 2W. Switch circuit 3A is composed of two two-way switch units which are the same as the two-way switch unit of the first embodiment, and each of them is connected in series to one of lead wires 71b.

Phase current sensor 5U is disposed between terminal 711 of U-phase stator winding 2U and inverter 12A to detect the motor driving current supplied from inverter 12A and the battery charging current supplied to inverter 12A, and phase current sensor 5W is disposed on extension 21 of W-phase stator winding 2W inside terminal 712 to detect the motor driving current supplied from inverter 12A and the battery charging current supplied from stator winding 2W to inverter 12A. Control circuit 4A has a pair of signal wires 72 connected across electric source 11 to detect the voltage thereof.

When the battery is intended to be charged, stator windings 2U and 2W are used as the inductor as in the first embodiment. Switching transistors 124 of inverter 12A are turned off, and a single-phase full-wave bridge circuit composed of four of six flywheel diodes 125 of inverter 12A function as the rectifier as in the first embodiment. Thus, the voltage of the electric source is raised by stator windings 2U and 2W, a high-voltage ac-power is rectified by flywheel diodes 125 of inverter 12A, and a high-voltage dc-power is supplied to battery 13A.

The signals from current sensors 5U and 5W are used by switch circuit 3A to PWM control the current supplied from electric source 11, thereby improving the power factor of the input power supplied to the ac-dc converting device. The current supplied from switch circuit 3 branches out to a current to inverter 12A and a current to stator windings 2U and 2W, which can be detected by current sensors 5U and 5W. The current supplied from electric source 11 is a sum of the currents detected by current sensors 5U and 5W.

The input power to be supplied to the ac-dc converting device is calculated from the detected voltage and the detected current. A target input current corresponding to the detected input voltage is decided when the calculated input power is compared with a target power. The target current is decided to be proportional to the detected input voltage. The turn-on period of each of switching transistors 31 is decided to eliminate the difference between the target current and a mean value of the current supplied by switch 3A in a switching cycle. Thus, the power supplied to inverter 12A is equalized to the target power and the input current becomes proportional to the input voltage, so that the power factor becomes nearly 1.

When a peak value of the input voltage is lower than the battery voltage, current is not supplied from switch 3A to inverter 12A directly. Thereafter, the turn-on period and turn-off period are set to be constant respectively.

Because the turn-on period of switch 3A is much shorter than the alternating cycle of electric source 11 that the voltages applied to stator windings 2U and 2W can be deemed to be constant during such short period. Because current does not flow to inverter 12A directly from switch 3A in this period, the impedance of the stator windings 2U and 2W at the side of switch 3A is the same as the inductances of the same windings.

Therefore, if the current flowing through windings 2U and 2W is 0 when switch 3A is turned on, the current increases proportionally to the input voltage and the turn on time. When switch 3A is turned off, current flows from stator windings 2U and 2W to inverter 12A. The turn-off period of switch 3A is set longer than the period in which the current flowing to the inverter becomes 0. Thus, since the turn-on period and the turn-off period are set as fixed values, the mean value of the input current becomes proportional to the input voltage.

Thus, inverter 12A for driving the motor and stator windings 2U and 2W are used for charging the battery, so that the combined device becomes compact and light, thereby reducing the cost thereof. In addition, current sensors 5U and 5W for controlling motor driving circuit D are also used for controlling switch 3A to improve the power factor of the input power, thereby improving the efficiency of the battery charging power without providing specific sensors.

Either one of switching transistors 124 of inverter 12A connected to stator winding 2V, which is not connected to electric source 11, maybe turned on when the battery is charged so that winding 2V is parallel to one of windings 2U and 2W which reduces the inductance of the windings. Therefore, the switching frequency can be increased to a frequency higher than the audio frequency without decreasing the output power, thereby reducing the noise and the size of the filter circuit 14. Switching transistors 124 connected to winding 2V are alternately turned on when the current flowing therethrough becomes 0 to prevent the voltage applied to winding 2V from being biased by a dc voltage. As a result, the electric corrosion can be prevented even if winding 2V is short-circuited to the vehicle body due to an insulation problem.

(Third Embodiment)

Figure 3:
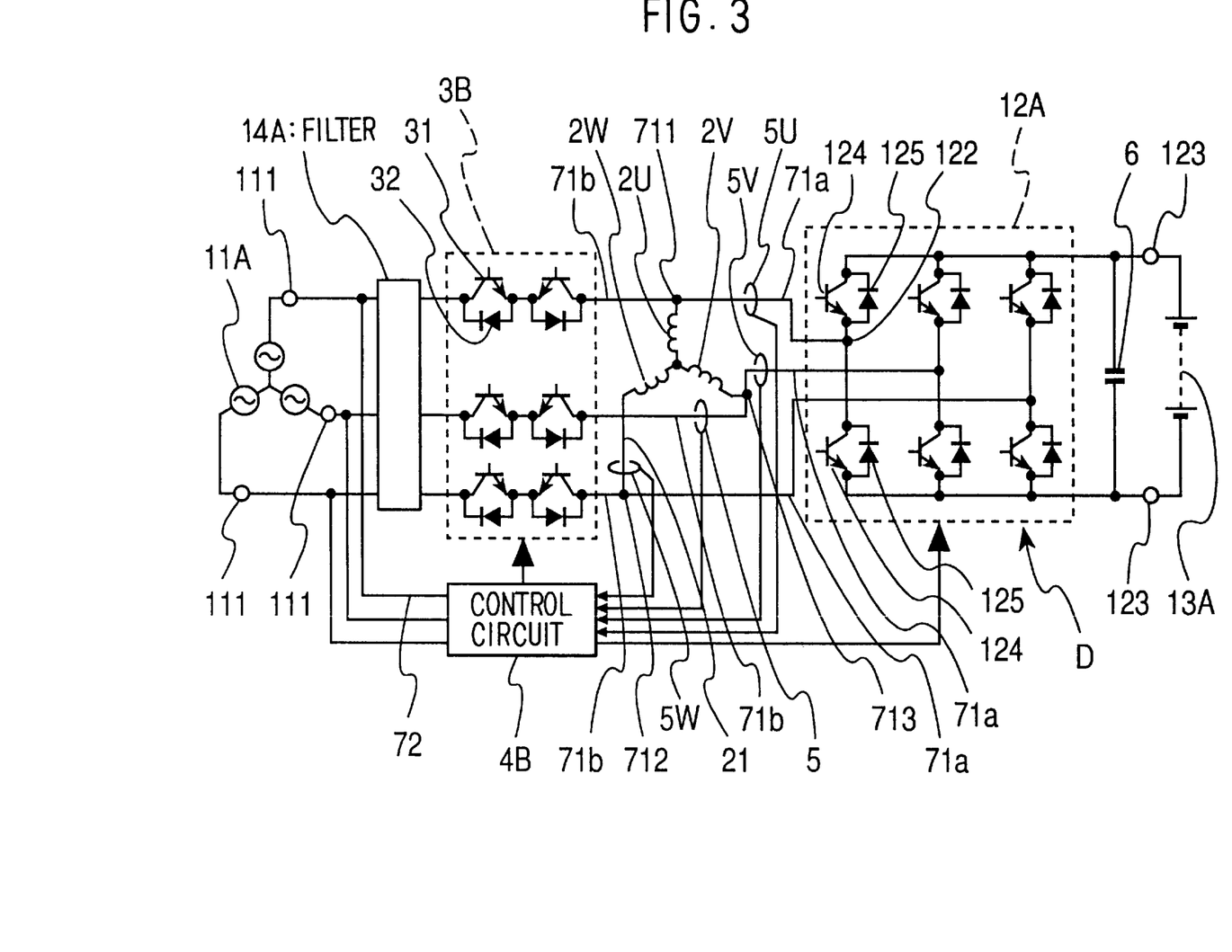
FIG. 3 is a circuit diagram showing an ac-dc power converting device according to a third embodiment of the present invention.

A battery charging system for an electric vehicle according to a third embodiment is described with reference to FIG. 3. The same reference numerals as those in FIG. 2 indicate substantially the same parts or components, and only different parts or components are mainly described hereafter.

This system uses a three-phase electric source 11A. Switch 3B has three series circuits each comprising a pair of the switching transistors having a diode connected in parallel. A phase current sensor 5V for detecting the motor driving current supplied from inverter 12A and the battery charging current supplied to inverter 12A is disposed between terminal 713 of V-phase stator winding 2V and inverter 12A. A current sensor 5 for detecting the battery charging current supplied from switch circuit 3B is disposed between terminal 713 and switch circuit 3B in addition to current sensors 5U and 5W, described above. The current supplied from electric source 11A is detected by sensors 5U, 5V, 5W and 5 and the power factor can be controlled to be nearly 1.

(Fourth Embodiment)

Figure 4:
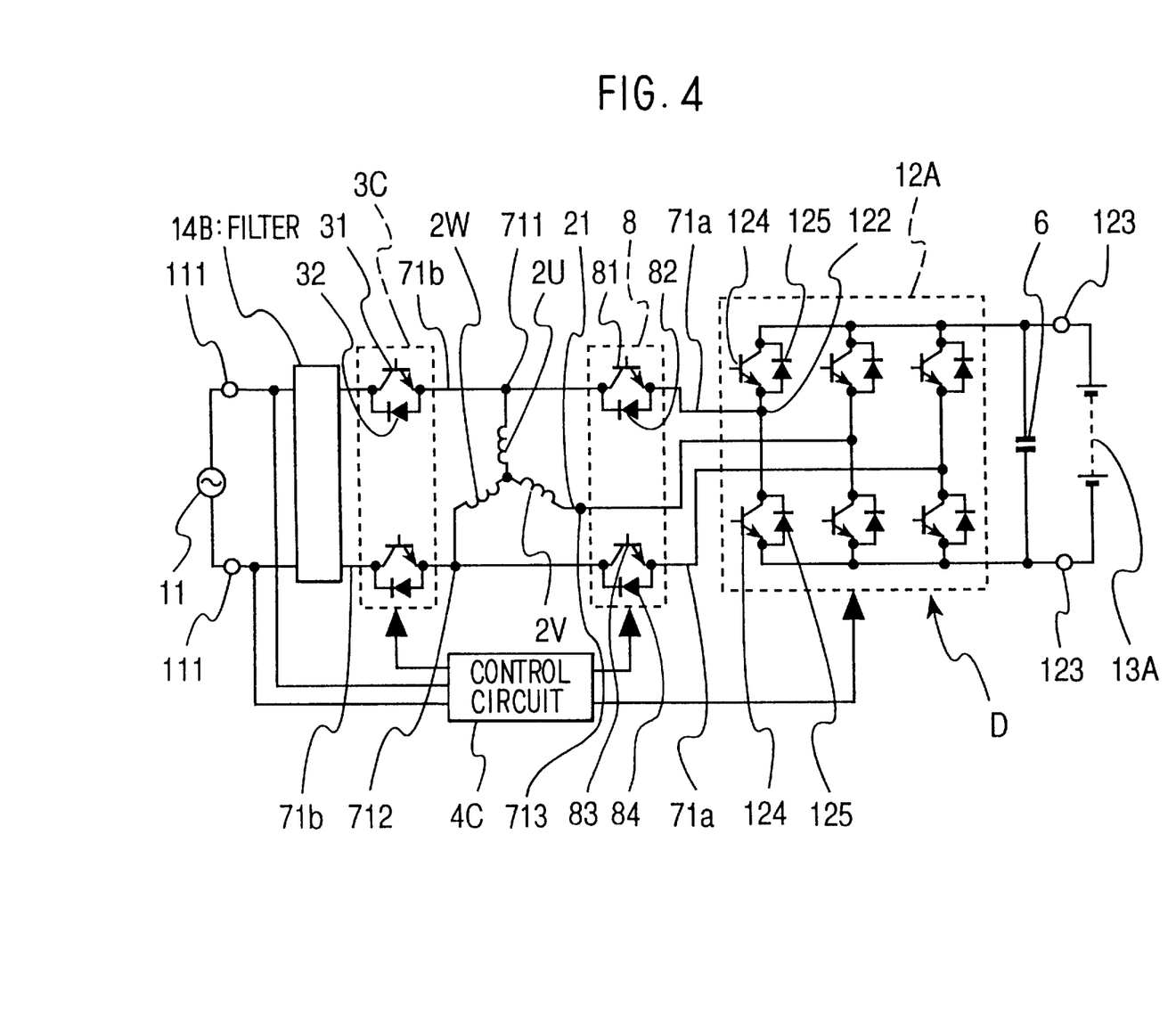
FIG. 4 is a circuit diagram showing an ac-dc power converting device according to a fourth embodiment of the present invention.

A battery charging system for an electric vehicle according to a fourth embodiment of the present invention is described with reference to FIG. 4. The parts and components denoted by the same reference numerals are substantially the same as those of the system shown in FIG. 2, and detailed descriptions thereof are omitted. Two-way switch circuit 3C for raising input voltage comprises a pair of switching transistors 31 with diodes 32 connected in parallel. A two-way switch circuit 8 for preventing rush current comprises of a pair of switching transistors 81 and 83 with diodes 82 and 84 connected in parallel and connected between inverter 12A and terminals 711 and 712 of stator windings 2U and 2W.

The bases of switching transistors 81 and 83 for preventing rush current are controlled by control circuit 4C, which is connected to the bases of switching transistors 31 of switch circuit 3C as well. Switching transistor 81 is turned off and switching transistor 83 is turned on when the voltage of upper terminal 111 of electric source 11 is positive, and switching transistor 81 is turned on and switching transistor 83 is turned off when the voltage of upper terminal 111 of electric source 11 is negative.

When upper terminal 111 of electric source 11 is positive, switching transistor 81 of switch circuit 8 is turned off so that rush current can be prevented from flowing to inverter 12A even if the source voltage is higher than the voltage of capacitor 6 and switching transistor 31 of switch 3C is turned on. As a result, filter circuit 14B need not prevent the rush current and, therefore, can be made compact. When switching transistor 31 is turned off, the electromagnetic energy accumulated in stator windings 2U and 2W is supplied to inverter 12A as a pulse current through switching transistor 83, which is turned on beforehand, and diode 82.

When upper terminal 111 of electric source 11 is negative, switching transistor 83 of switch 8 is turned off to prevent the rush current, and substantially the same operation is repeated to supply the electro-magnetic energy of windings 2U and 2W to inverter 12A through switching transistor 81 and diode 84.

Because no direct current is supplied to inverter 12A from switch 3C even when the battery voltage is lower than the source voltage, the impedance of the latter circuit of switch 3C being turned on is solely due to the inductances of stator windings 2U and 2W. Thus, the on-off time of switch 3A is fixed suitably so that the mean value of the input current in a switching cycle can be proportional to the input voltage.

Switch 8 for preventing rush current can be also applied to the system shown in FIG. 1.

(Fifth Embodiment)

Figure 5:
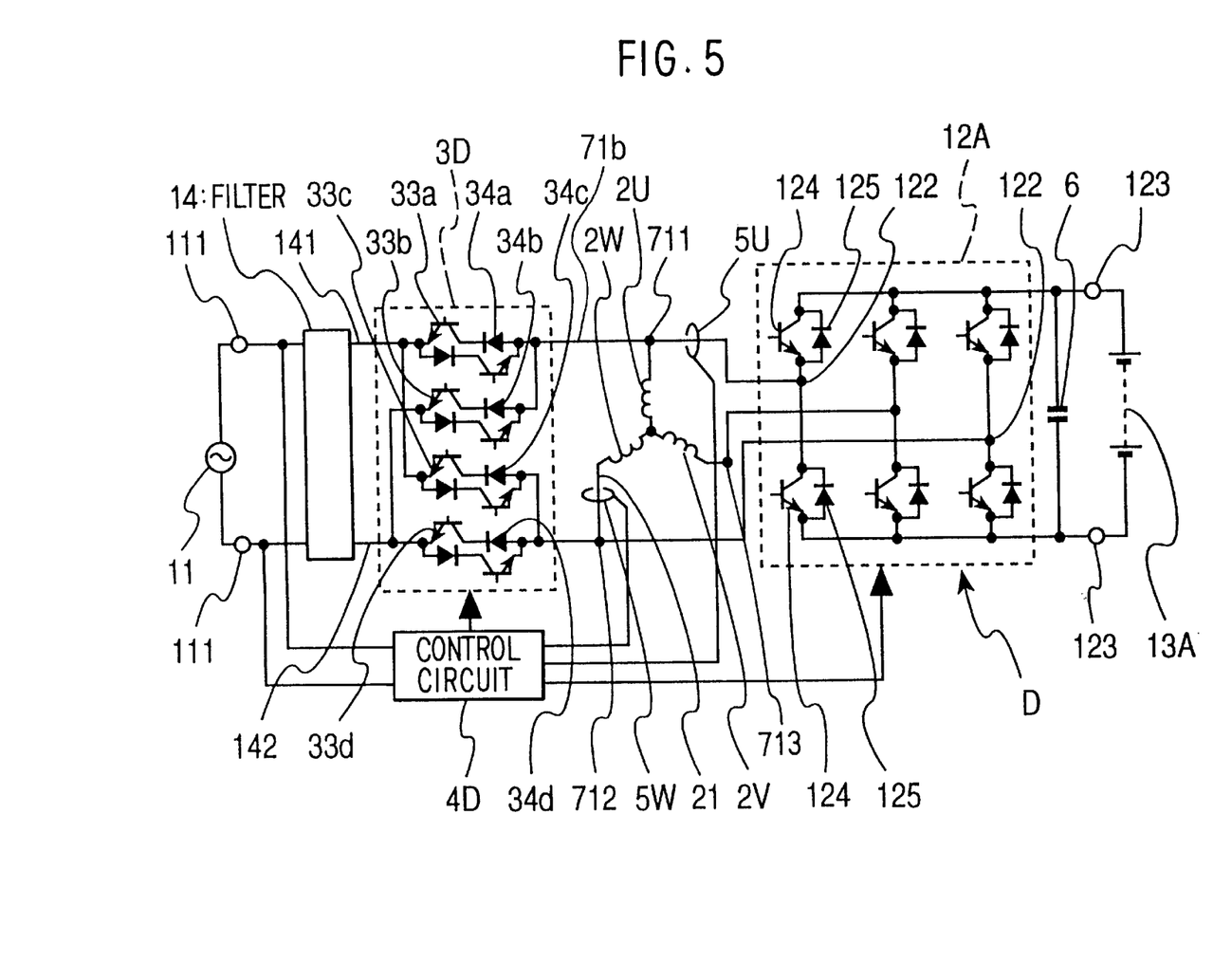
FIG. 5 is a circuit diagram showing an ac-dc power converting device according to a fifth embodiment of the present invention.

A battery charging system according to a fifth embodiment of the present invention is described with reference to FIG. 5. The parts and components denoted by the same reference numerals are substantially the same as those of the system shown in FIG. 2, and detailed descriptions thereof are omitted.

Switch circuit 3D is composed of four two-way switching units each having a pair of transistors 33a, 33b, 33c and 33d with series connected diodes 34a, 34b, 34c and 34d. One of a pair of the transistors is connected with the other so that the conductive polarity becomes opposite to form a two-way switching unit. The four two-way switching units form a cross-over circuit having input terminals connected to the filter output terminals 141 and 142 and output terminals connected to a pair of lead wires 71b, which are connected to U-phase stator winding 2U and W-phase stator winding 2W.

When switching transistor 33a is turned on, switching transistor 33d is turned on and switching transistors 33b and 33c are turned off. When switching transistors 33b and 33c are turned on, switching transistors 33a and 33d are turned on.

When switching transistors 33a and 33d are turned on, filter output terminal 141 is connected to stator winding 2U and filter output terminal 142 is connected to stator winding 2W. On the other hand, when switching transistors 33b and 33c are turned on, filer output terminal 141 is connected to stator winding 2W and filter output terminal 142 is connected to stator winding 2U. Thus, the voltage applied to stator windings 2U and 2W can be turned over at the switching cycle of switch 3D. The above operation increases the base frequency of the voltage applied to stator windings 2U and 2W from the frequency of the ac electric source 11 up to half of the switching frequency of switch 3D. This suppress the audible electromagnetic noises due to ac electric source 11. Thus the frequency of the voltage applied to stator windings 2U and 2W can be increased from the frequency of the power source up to half of the switching frequency of switch 3D.

(Sixth Embodiment)

Figure 6:
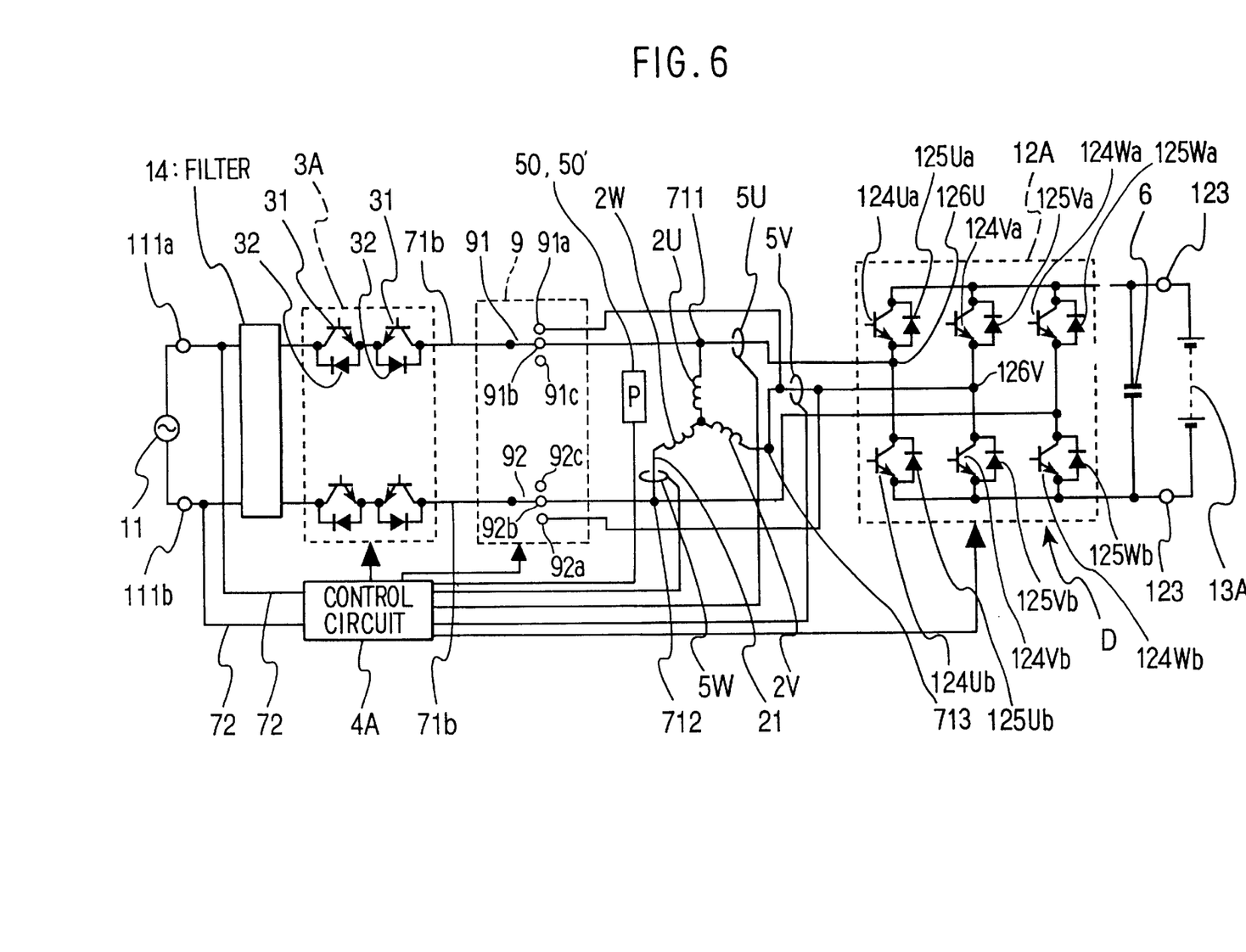
FIG. 6 is a circuit diagram showing an ac-dc power converting device according to a sixth embodiment of the present invention.

A battery charging system according to a sixth embodiment is described with reference to FIG. 6.

If a permanent magnet type motor is used as the wheel-driving motor in the system according to the second embodiment of the invention which utilizes windings 2U and 2W as the inductor, the driving motor may be vibrated by the alternating magnetic field generated by windings 2U and 2W while they are supplied with ac current from ac electric source 11. If the supplied current is large, vibration noise may become harsh. Such vibration may wear some parts or components of the driving system.

In order to prevent the above problems, the battery charging system according to the sixth embodiment provides another current sensor 5V and a relay circuit 9 in addition to the battery charging system according to the second embodiment. Winding 2V is supplied with PWM-controlled current from inverter 12A (described below).

Relay circuit 9 comprised of a pair of first and second triple pole switches 91 and 92. The first triple pole switch (hereinafter referred to as first switch) 91 has a terminal 91a connected to output terminal 713 of winding 2V through a lead wire, a terminal 91b connected to output terminal 711 of winding 2U and a floating terminal 91c. Second triple pole switch (hereinafter referred to as second switch) 92 has terminal 92a connected to the lead wire connecting terminal 713, terminal 91a and terminal 126V of inverter 12A which is connected between switching transistors 124Va and 124Vb, a terminal 92b connected to output terminal 712 of winding 2W and a floating terminal 92c.

Current sensor 5V is disposed on the lead wire connecting terminal 713 and terminal 126V of inverter 12A.

(1) When first switch 91 and second switch 92 connect switching circuit 3A respectively with second terminals 91b and 92b, ac current is supplied to windings 2U and 2W.

(2) When first switch 91 connects the switch circuit 3A with second terminal 91b and second switch 92 connects the switch circuit with first terminal 92a, ac current is supplied to windings 2U and 2V.

(3) When first switch 91 connects switch circuit 3A with first terminal 91a and second switch 92 connect switch circuit with second terminal 92b, ac current is supplied to windings 2V and 2W.

(4) In order to prevent the motor driving current from flowing to switch circuit 3A, the first and second switches connect floating terminals 91c and 92c when the motor is operated.

(5) When one of first and second switches 91 and 92 connects switch circuit 3A with one of terminals 91a and 92a, the other switch is prohibited to connect switch circuit 3A with the other of terminal 91a and 92a.

The rotor position of the driving motor is detected by a position sensor 50 which is installed in the motor.

Figure 7:
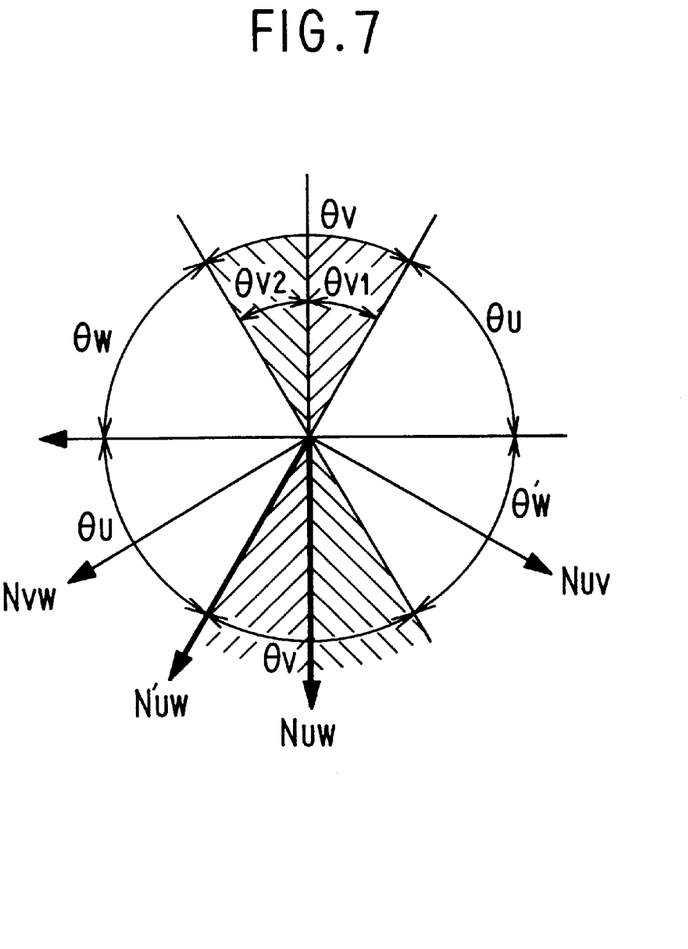
FIG. 7 is a chart showing magnetomotive force generated by the stator windings of a driving motor of an electric vehicle while vehicle battery is charged by an ac electric source.

As shown in FIG. 7, when current is supplied to windings 2U and 2W, magnetomotive force Nuw is generated to pass through arc range θv. When current is supplied to windings 2U and 2V, the magnetomotive force Nuv is generated to pass through arc range θw. And when current is supplied to windings 2V and 2W, the magnetomotive force is generated to pass through arc range θu.

If the rotor is located in range θw, relay 9 is controlled to connect windings 2U and 2V with switch circuit 3A. In the same manner, if the rotor is located in range θv, relay 9 is controlled to connect windings 2W and 2U with switch circuit 3A, and if the rotor is located in range θu, relay 9 is controlled to connect windings 2V and 2W with switch circuit 3A.

Figure 8:
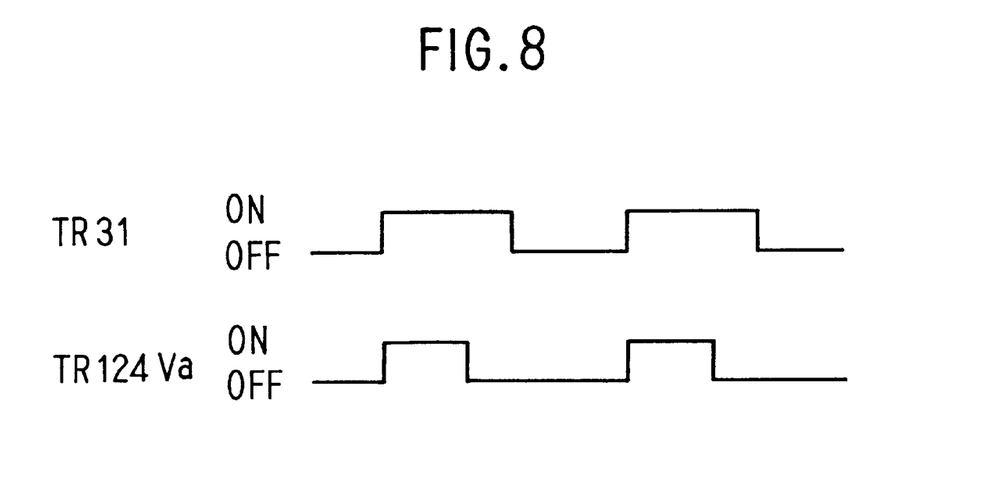
FIG. 8 is a timing chart of current supplied to the stator windings.

If the rotor is located in range θvl which is the right half of upper arc range θv and the left half of lower arc range θv, relay 9 connects winding 2W and 2U, and switch circuit 3A and inverter 12A operate as follows: if upper terminal 111a of electric source 11 provides plus voltage, transistor 124Va of inverter 12A is operated in synchronism with the operation of switching transistors 31 as shown in FIG. 8; on the other hand, if terminal 111a provides minus voltage, transistor 124Vb of inverter 12A is operated in synchronism with switching transistor 31.

If the rotor is located in range θw2 which is the left half of arc range θw, switch circuit 3A and inverter 12A operate as follows: if upper terminal 111a of electric source 11 provides plus voltage, transistor 124Vb of inverter 12A is operated in synchronism with the operation of switching transistors 31 as in the same manner shown in FIG. 8; on the other hand, if terminal 111a provides minus voltage, transistor 124Va of inverter 12A is operated in synchronism with switching transistor 31, as shown in FIG. 8.

Thus, winding 2V is supplied with current from transistor 124Va of inverter circuit 12A through switching circuit 3A, relay 9, terminal 91b, terminal 126U of inverter 12A, and diode 125Ua of inverter 12A. The current passes through winding 2V and returns through winding 2W and terminal 92b of relay 9 to switching circuit 3A. Accordingly, the direction of the magnetomotive force generated by stator windings 2U, 2V and 2W are changed.

When the on-duty of transistor 124Va of inverter 12A is zero, the magnetomotive force is directed in the same direction as magnetomotive force Nuw. When the on-duty of transistor 124Va is the same as the on-duty of transistor 31, magnetomotive force N'uw is generated as shown in FIG. 7. Thus, the magnetomotive force can be controlled to balance with the magnetic force of the permanent magnet rotor by changing the on-duty of transistor 12 Va.

If the rotor is located in a range other than θv, substantially the same operation is carried out, and the description is therefore omitted.

The motor vibration can also be controlled by installing vibration sensor 50' instead of the position sensor 50.

The motor vibration is detected by vibration sensor 50' each time the relay changes connection of a pair of stator windings 2U, 2V, 2W. Then, one of the connections in which the motor vibration is minimum is selected by relay 9.

If the selected pair is windings 2U and 2W, unselected winding 2U is supplied with current in a similar manner as described above, and the current is changed to determine an amount at which the motor vibration is minimum. The amount of the current is held thereafter.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An ac-dc power converting device for converting ac power of an ac electric source providing a voltage alternating in a predetermined cycle to dc power supplied to an electric load comprising:

a terminal capable of being connected to said ac electric source;

a rectifier having an input terminal portion and an output terminal portion capable of being connected to said electric load;

an inductor connected in parallel with said input terminal portion of said rectifier; and a first two-way switch connected between said terminal and said inductor for turning on and off current supplied to said inductor to accumulate electric power in said inductor and discharge the same from said inductor, at a cycle shorter than said predetermined cycle, thereby raising a voltage across said input terminal portion of said rectifier to a value higher than said voltage of said electric source.

2. An ac-dc power converting device according to claim 1, wherein said first two-way switch comprises a pair of two-way switch units, connected between said terminal and said inductor, said pair of two-way switch units turning on and off current flowing therethrough in opposite directions.

3. An ac-dc power converting device according to claim 1, further comprising a second two-way switch connected between said inductor and said input portion of said rectifier, said second two-way switch interrupting current supplied to said rectifier when said first two-way switch turns on.

4. An ac-dc power converting device according to claim 1, wherein said first two-way switch comprises:

a current detecting unit for detecting current supplied to said device from said ac electric source; and a control unit for controlling said first two-way switch according to a current signal of said current detecting unit so that a mean value of current supplied to said device can be proportional to an instantaneous value of voltage of said electric source.

5. An ac-dc power converting device according to claim 1, wherein said first two-way switch remains turned off until current of said inductor becomes zero.

6. An ac-dc power converting device according to claim 1, further comprising an ac motor having a plurality of stator windings and an inverter having a plurality of flywheel diodes for controlling said motor, wherein said inductor comprises at least one of said stator windings, and said rectifier comprises a portion of said flywheel diodes.

7. An ac-dc power converting device according to claim 6, wherein said electric load comprises a battery.

8. An ac-dc power converting device according to claim 6, wherein said current sensor is disposed between said stator winding and a portion connecting said first two-way switch and said inverter so that said current sensor can detect both currents supplied respectively from said first switch and said inverter.

9. An ac-dc power converting device according to claim 4, further comprising:

an ac motor having multiple phase-windings;

an inverter having switching transistors with flywheel diodes connected in parallel and connected to said phase windings, said inverter controlling said ac motor; and a plurality of current sensors for detecting currents of said phase windings supplied from said inverter, wherein said inductor comprises a portion of said phase windings;

said rectifier comprises a portion of said flywheel diodes; and said current detecting unit comprises a portion of said current sensors disposed to measure current supplied from said first two-way switch by an arithmetic operation of said current detected.

10. An ac-dc power converting device according to claim 1, wherein said first two-way switch comprises four two-way switching units forming a cross-over circuit having input terminals connected to said terminal and output terminals connected to said inductor.

11. An ac-dc power converting device as claimed in claim 6, further comprising:

a relay connected between said first two-way switch for alternating the connection obetween said first two-way bswitch and said at least one of the stator windings;

means for detecting a rotor condition and for providing a signal related to rotor vibraton; and a control unit, connected to said rotor condition detecting means, for controlling said relay and said inverter according to said signal related to rotor vibration so that at least one of said stator windings is supplied with control current from said relay and said inverter to suppress vibration of said rotor while said dc power is supplied to said electric load.

12. An ac-dc power converting device according to claim 11, wherein said relay cut connection between said first two-way switch and said stator windings while said ac motor is driven by said inverter.

13. An ac-dc power converting device according to claim 11, wherein said rotor condition detecting means comprises a position sensor for detecting position of said rotor relative to said stator windings.

14. An ac-dc power converting device according to claim 11, wherein said rotor condition detecting means comprises a vibration sensor for detecting vibration of said rotor.

* * * * *